United States Patent Office 3,169,123
Patented Feb. 9, 1965

3,169,123
MONOAZO DYES FREE FROM SULFONIC ACID GROUPS
Reinhard Neier, Basel, Switzerland, assignor to Sandoz Ltd., Basel, Switzerland
No Drawing. Filed Mar. 22, 1962, Ser. No. 181,811
Claims priority, application Switzerland, Mar. 22, 1961, 3,384/61
8 Claims. (Cl. 260—145)

This invention relates to monoazo groups which are free from sulfonic acid groups and have the formula

wherein R is a substituted or unsubstituted phenyl or naphthyl radical, HOOC—A—X is the radical of a diazo component of the benzene series which may contain further substituents, X is the hydroxyl group or a substituent which can be converted into this group and is in the adjacent position to the —N=N— group, and B is the radical of a coupling component of the naphthalene series which may be further substituted and in which the —NH—R— group is in the adjacent position to the —N=N— group.

These new dyestuffs I can conveniently be prepared by coupling in the adjacent position to the —NH—R— group one mol of the diazo compound of an amine of the formula

wherein HOOC—A—X has the aforestated meaning, with one mole of a compound of the formula

B—NH—R        (III)

wherein B and R have the aforestated meanings.

The coupling of the diazotized amino compound of Formula II with a compound of Formula III is effected to best advantage in an aqueous acidic medium.

The new azo dyes may be metallized either in substance or on the fiber. They can be treated with a metal-yielding agent under conditions which lead to the formation of a metal-containing azo dye containing essentially one metal atom in complex combination with two molecules of the azo compound. For the production of these 1:2 metal complex compounds it is preferable to allow an amount of a metal-yielding agent, e.g. chromium-, iron- or cobalt-yielding agent, containing less than two but at least one atom of metal to act upon two molecules of the azo compound.

Metallization is carried out preferably in an aqueous alkaline or organic medium, to which the metal compound is added in presence of a compound which maintains the metal dissolved in complex combination in caustic alkaline medium, for example, tartaric, citric or lactic acid.

Suitable chromium compounds are e.g. chromic fluoride, chromic sulfate, chromic formate, chromic acetate, chromic potassium sulfate and chromic ammonium sulfate. The chromates also, e.g. sodium or potassium chromate or bichromate, are highly suitable for metallizing the monoazo dyes. Examples of suitable cobalt compounds are cobaltous formate, cobaltous acetate and cobaltous sulfate. Ferric chloride and ferric sulfate are suitable iron compounds.

The metal complex compounds obtained are precipitated from the aqueous medium by the addition of salt, and then filtered, washed if necessary, and dried.

Metallization of a mixture of one or more monoazo dyes of Formula I and other metallizable azo dyes results in valuable mixed homogeneous and/or heterogeneous metal complex dyes, the shade and dyeing properties of which can to a great extent be adjusted to their particular use by changing the mixture of azo compounds.

The azo dyes obtained are suitable for dyeing natural and synthetic polyamide fibers, wool, silk and leather in blue, grey, green and brown shades. After metallization on the fiber, either in the dyebath or a fresh bath, the dyeings are fast to light and wet treatments.

The homogeneous and/or mixed heterogeneous metal-containing azo-dyes produced in substance are well soluble in water and dye wool, silk, leather and synthetic polyamide fibers from a neutral or weakly acid dyebath in grey, blue, green and brown shades with good light fastness and good wet fastness properties, such as fastness to washing, acid and alkaline milling, perspiration, sea water, rubbing, dry cleaning, and good stability to heat. These dyes are also well soluble in polar solvents such as alcohols, ketones and carboxylic acid esters, e.g. glycols, glycol ether, ethanol, acetone, acetic acid ethyl ester, propionic acid ethyl ester, amyl acetate, etc. They are therefore suitable for the dyeing and printing of leather, for the spin-dyeing of man-made fibers in solution in organic solvents, and for the coloration of plastics and lacquers. They give brown bottle-green to grey shades of very good light fastness and good wet fastness properties including excellent fastness to washing, solvents, cross dyeing, water, perspiration, dry cleaning, decatizing, pressing and sublimation.

In the following examples the parts and percentages are by weight and the temperatures in degrees centigrade.

EXAMPLE 1

19.8 parts of 2-amino-4-nitro-1-hydroxybenzene-6-carboxylic acid are stirred with 18 parts of 30% hydrochloric acid and 100 parts of water and diazotized with 6.9 parts of sodium nitrite with ice cooling. The diazo suspension is run into a solution of 21.9 parts of 2-phenylaminonaphthalene in 150 parts of acetic acid and the mass stirred at 50° until the coupling reaction is completed. The precipitated dark-colored dye is filtered off, dried and pulverized. On the addition of caustic soda it dissolves in water with a red-brown coloration.

For conversion into the cobalt complex, 21.4 parts of the above dye and 7.5 parts of cobaltous sulfate in 120 parts of formamide are heated at 100° until metallization is completed. The cobalt complex compound is precipitated by dilution with 300 parts of concentrated sodium chloride solution, and filtered off. It is purified by stirring in dilute aqueous sodium hydroxide solution, after which it is precipitated with sodium chloride, filtered, dried, and ground. A dark-colored powder is obtained which dyes wool, silk, leather and synthetic polyamide fibers from aqueous solution in blue-green shades with good fastness to light, washing, perspiration, sea water, rubbing, dry cleaning, acid and alkaline milling, and good stability to heat.

The dye dissolves readily in polar solvents e.g. glycols, ethanol, acetone, acetic acid ethyl ester, dimethyl formamide, propionic acid ethyl ester, amyl acetate, etc., and is therefore suitable for the dyeing of man-made fibers which are spun from solution in organic solvents, e.g. cellulose acetate, polyester and polyacryl-nitrile fibers. The green spun-dyed shades obtained have extremely good fastness to light and washing, combined with excellent fastness to cross dyeing, water, perspiration, dry cleaning, decatizing, pressing and sublimation. The dye can also be employed for the coloration of plastics and lacquers (e.g. nitrocellulose and vinyl lacquers) in bottle-green shades.

For conversion into the chromium complex, 21.4 parts of the unmetallized dye and 14 parts of crystallized chromic potassium sulfate in a mixture of 60 parts of formamide and 60 parts of urea are heated at 130° until metallization is completed. The chromium complex compound is precipitated by dilution with 300 parts of water and filtered off. It is purified by stirring in dilute aqueous sodium hydroxide solution, precipitated by the addition of sodium chloride, filtered, dried and ground. The dye is a dark-colored powder which dyes wool, silk, leather and synthetic polyamide fibers from aqueous solution in greenish grey shades. It is also suitable for the coloration of lacquers (e.g. nitrocellulose and vinyl lacquers) and for the dyeing of grey shades in man-made fibers, e.g. cellulose acetate, which are spun from solution in organic solvents such as acetone, acetic acid ethyl ester, etc.

In the following Table 1 are listed further starting materials for the production of homogeneous monoazo dyes of the formula

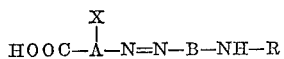

and metal-containing azo dyes of the formula

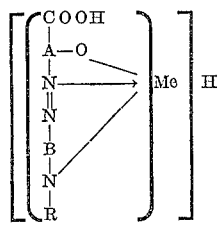

(cf. Formula I and the definitions thereunder), prepared according to the procedure of Example 1. In column (1) the diazo component is given, in column (2) the azo component, in column (3) the metal used for metal complex formation, and in column (4) the shade of the spin-dyeing of the metal complex compound in cellulose acetate.

*Table 1*

| Example No. | Diazo Component (1) | Azo Component (2) | Metal (3) | Shade of Spin-dyeing in Cellulose Acetate (4) |
|---|---|---|---|---|
| 2 | 2-amino-4-nitro-1-hydroxybenzene-6-carboxylic acid. | 2-(3'-chloro)-phenyl-aminonapthalene. | Co / Fe / Cr | Green. / Brown. / Greenish grey. |
| 3 | ----do---- | 2-(2'-methyl)-phenylaminonaphthalene. | Co | Green. |
| 4 | ----do---- | 2-(4'-methoxy)-phenylaminonaphthalene. | Co | Do. |
| 5 | ----do---- | 2-(2',5'-dichloro)-phenylaminonaphthalene. | Co | Do. |
| 6 | ----do---- | 2-(2'-napthyl)-aminonaphthalene. | Co | Do. |
| 7 | ----do---- | 2,2'-dinaphthylamine. | Cr | Green-grey. |
| 8 | 2-amino-4-chloro-1-hydroxybenzene-6-carboxylic acid. | 2-phenylaminonaphthalene. | Co | Blue. |
| 9 | 2-amino-4-methyl-1-hydroxybenzene-6-carboxylic acid. | ----do---- | Co | Do. |
| 10 | 2-amino-1-hydroxybenzene-6-carboxylic acid. | 2-(3'-chloro)-phenyl-aminonaphthalene. | Co | Do. |
| 11 | 2-amino-4-bromo-1-hydroxybenzene-6-carboxylic acid. | ----do---- | Co | Do. |
| 12 | 2-amino-4-tert.butyl-1-hydroxybenzene-6-carboxylic acid. | 2-(2',4',6'-trimethyl)-phenylaminonaphthalene. | Co | Do. |
| 13 | 2-amino-1-hydroxy-4-nitrobenzene-6-carboxylic acid. | 2-(3'-bromo)-phenyl-aminonapthalene. | Co | Green. |

*Table 1—Continued*

| Example No. | Diazo Component (1) | Azo Component (2) | Metal (3) | Shade of Spin-dyeing in Cellulose Acetate (4) |
|---|---|---|---|---|
| 14 | 2-amino-1-hydroxy-4-nitrobenzene-6-carboxylic acid. | 2-(4'-ethoxy)-phenylaminonaphthalene. | Co | Do. |
| 15 | ----do---- | 2-3(3'-sulfamido)-phenylaminonaphthalene. | Co | Do. |
| 16 | ----do---- | 1-phenylaminonaphthalene-4-sulfonic acid amide. | Co | Do. |

EXAMPLE 17

18 parts of the chromium-containing dye obtained from diazotized 2-amino-1-hydroxy-4-nitrobenzene and 2-hydroxynaphthalene with subsequent chroming, which contains one molecule of metal to one molecule of dye, are heated at 100° with 12.4 parts of the metal-free dye obtainable according to Example 1 in 250 parts of formamide and 10 parts of 10% sodium hydroxide solution until the metal-free dye has disappeared. The resulting chromium complex compound is precipitated by diluting the mass with 700 parts of water, filtered off and washed well with water. On drying and grinding it is obtained as a grey powder which dissolves well in polar solvents and is suitable for spin dyeing of man-made fibers dissolved in organic solvents in reddish grey shades. Plastics and lacquers, such as nitro-cellulose and vinyl lacquers, can also be colored with the dyes in shades ranging from reddish grey to black. The fibers and articles thus dyed or colored have very good light fastness and good fastness to washing, cross dyeing, water, perspiration, dry cleaning, decatizing, pressing and sublimation.

EXAMPLE 18

21.4 parts of the monoazo dye which is obtained from diazotized 2-amino-4-nitro-1-hydroxybenzene-6-carboxylic acid and 2-phenylaminonaphthalene according to the procedure described in Example 1, and 10.6 parts of the dye produced from diazotized 2-amino-1-hydroxybenzene-4-sulfonic acid methyl amide and 1-(3'-chloro)-phenyl-3-methyl-5-pyrazolone are heated with 11.3 parts of cobaltous sulfate in 200 parts of formamide at 100° until metallization is complete. The cobalt complex compound is precipitated by dilution with 400 parts of water and filtered off. It is purified by dissolving in dilute aqueous sodium hydroxide solution, and the dye precipitated by the addition of sodium chloride, filtered, dried and ground. It is a dark-colored powder which can be applied from aqueous solution to wool, silk, leather and synthetic polyamide fibers to give olive-green dyeings of high fastness to light, washing and milling. Owing to its good solubility in polar solvents, e.g. acetone, it is suitable for the spin dyeing of man-made fibers in solution in organic solvents, and for the coloration of plastics and lacquers, e.g. nitrocellulose and vinyl lacquers, in olive-green shades.

In the following Table 2 the structural composition of some mixed heterogeneous metal complex dyes is indicated. In column (1) the amount of the first monoazo dye used is given, in column (2) the structural composition of the monoazo compound of Formula (I) is shown, in column (3) the amount of the second azo dye used, in column (4) the structural composition of some azo dyes suitable for the formation of metal complex formation, and in column (6) the shade of the spin-dyeing in cellulose acetate.

Table 2

| Example No. | Parts (1) | 1st Dye (2) | Parts (3) | 2nd Dye (4) | Metal (5) | Shade of Spin Dyeing in Cellulose Acetate (6) |
|---|---|---|---|---|---|---|
| 19 | 21.4 | 2-amino-4-nitro-1-hydroxybenzene-6-carboxylic acid → 2-phenylamino-napthalene. | 11.5 | 2-amino-4-chloro-1-hydroxybenzene-6-carboxylic acid → 2-phenylaminonaphthalene. | Co | Blue-green. |
| 20 | 15.7 | ....do.... | 11.5 | 2-amino-5-nitro-1-hydroxybenzene → 2-hydroxynaphthalene. | Co | Grey-blue. |
| 21 | 21.4 | ....do.... | 10.3 | 2-amino-1-hydroxybenzene-4-sulfonic acid amide → 2-acetoacetylamino-2-ethylhexane. | Co | Green. |
| 22 | 23.1 | 2-amino-4-nitro-1-hydroxybenzene-6-carboxylic acid → 2-(3'-chloro)-phenylamino-naphthalene. | 10.4 | 2-amino-1-hydroxybenzene-4-sulfonic acid-(3'-methoxy)-propylamide → 2-hydroxynaphthalene. | Co | Grey-violet. |
| 23 | 23.1 | ....do.... | 13.5 | 2-amino-1-hydroxybenzene-4-sulfonic acid-(2'-carboxy)-phenylamide → 2-phenylaminonaphthalene. | Co | Blue-green. |
| 24 | 23.1 | 2-amino-4-nitro-1-hydroxybenzene-6-carboxylic acid → 2-(3'-chloro)-phenylamino-naphthalene. | 7.8 | 2-amino-4-nitro 1-hydroxybenzene → 2-hydroxynaphthalene. | Co | Grey. |
| 25 | 16.4 | 2-amino-4-chloro-1-hydroxybenzene-6-carboxylic acid → 2-(4'-methyl)-phenylamino-naphthalene. | 14.2 | 2-amino-1-hydroxybenzene-4-sulfonic acid amide → 1-hydroxy-4-methoxynaphthalene. | Co | Blue. |

DYEING EXAMPLE A 100 parts of secondary cellulose acetate with a content of 54–55% of splittable acetic acid are dissolved in 300 parts of solvent, e.g. a mixture of 275 parts of acetone and 25 parts of methanol. The mass is stirred and left overnight to swell. 1 part of the cobalt-containing dye produced according to the procedure of Example 1 is dissolved in 60 parts of the same solvent, and this solution added to the cellulose acetate solution. The whole is stirred for sufficient time to allow 60 parts of solvent to evaporate. It is then filtered through a cotton filter and a cotton wool pressure filter and spun as filament in the same way as undyed cellulose acetate.

DYEING EXAMPLE B

A dyebath is prepared with 1000 parts of water and 0.2 part of the dye obtained as described in Example 18. At 40°, 10 parts of wool, previously wetted out, are entered. The bath is heated to 100° in 20 minutes and maintained at this temperature for 1 hour. During the dyeing process, 2 parts of 10% acetic acid are added dropwise to the boiling bath, and the water lost by evaporation is replaced from time to time as necessary. On completion of dyeing the wool is removed, rinsed and dried; it is dyed in an olive-green shade.

DYEING EXAMPLE C

A lacquer solution is prepared with 20 parts of the vinyl chloride-vinyl acetate copolymer composition, "Vinylite VMCH" (registered trademark of Union Carbide Corporation), 70 parts of methyl ethyl ketone and 10 parts of ethylene glycol. 0.5 part of the cobalt-containing dye obtained according to Example 2 are stirred into 10 parts of this lacquer solution, which is then diluted with 25 parts of a 1:1 mixture of methyl ethyl ketone and cyclohexanone. The colored lacquer solution is applied to a sheet of aluminum and air dried. The coating is bottle-green in shade and of good light fastness.

Formulae of representative dyes of the foregoing examples are as follows:

*Example 1.*—The 1:2 chromium and the 1:2 cobalt complex compounds of the monoazo dye of the formula

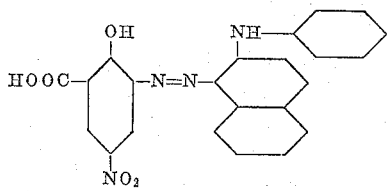

in the metal complex form

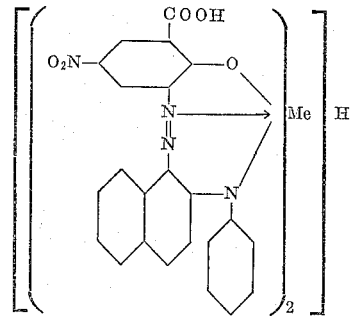

Me=Co or Cr

*Example 2.*—The 1:2 cobalt or chromium or iron complex compound of the monoazo dye of the formula

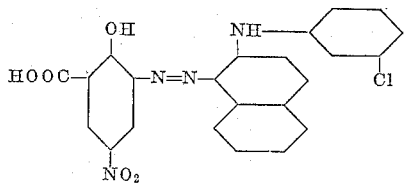

in the metal complex form

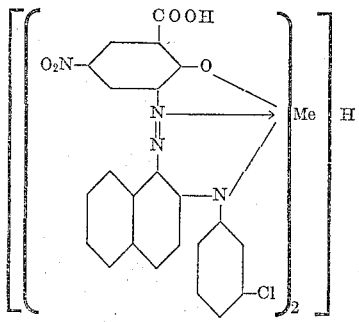

Me=Co or Cr or Fe

*Example 3.*—The 1:2 cobalt complex compound of the monoazo dye of the formula

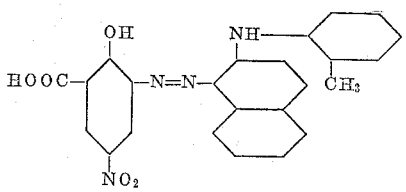

in the metal complex form

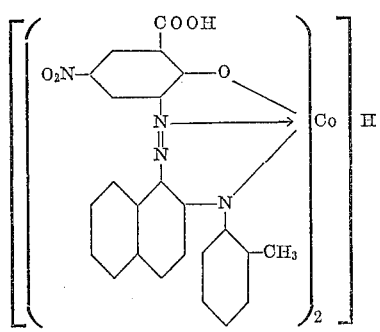

*Example 17.*—The 1:2 homogeneous chromium mixed complex compound obtained from the mixture of one molecule of each of the monoazo dyes of the formula

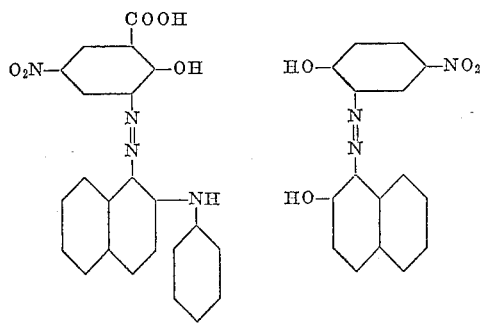

in the metal complex form

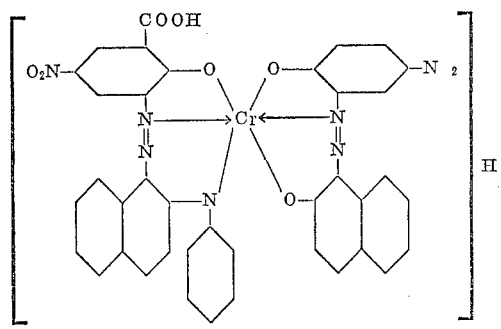

*Example 18.*—The 1:2 heterogeneous cobalt mixed complex compounds obtained from the mixture of the monoazo dyes of the formula

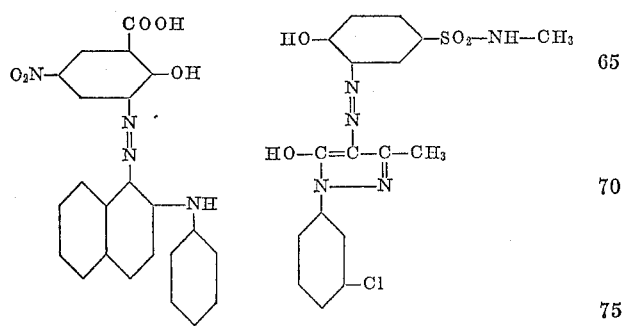

in the metal complex form

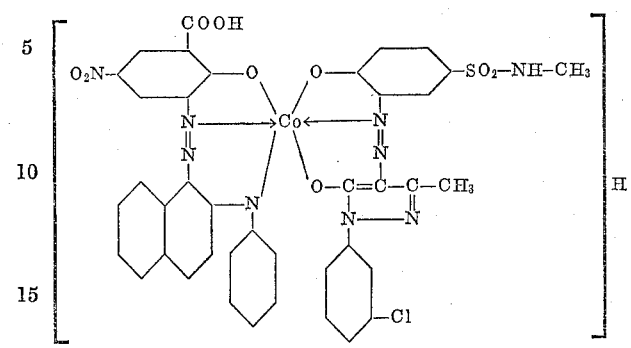

*Example 19.*—The 1:2 heterogeneous cobalt mixed complex compounds obtained from the mixture of the monoazo dyes of the formula

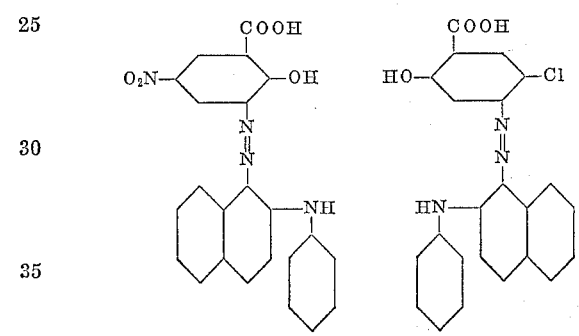

in the metal complex form

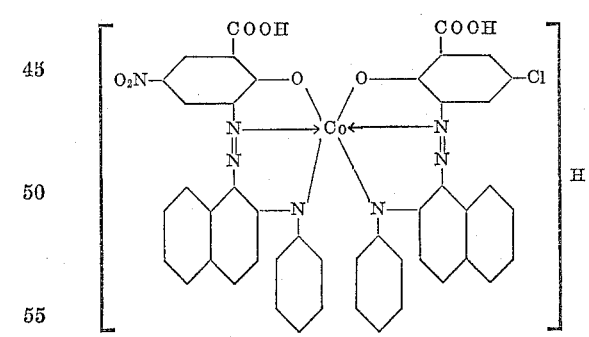

*Example 20.*—The 1:2 heterogeneous cobalt mixed complex compounds obtained from the mixture of the monoazo dyes of the formula

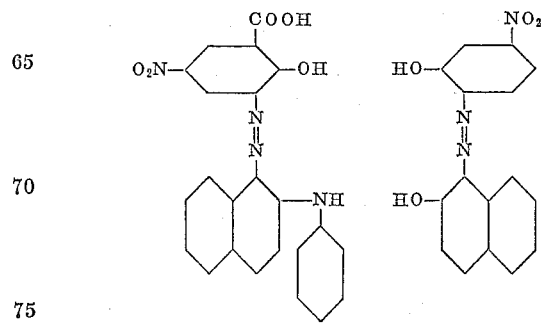

in the metal complex form

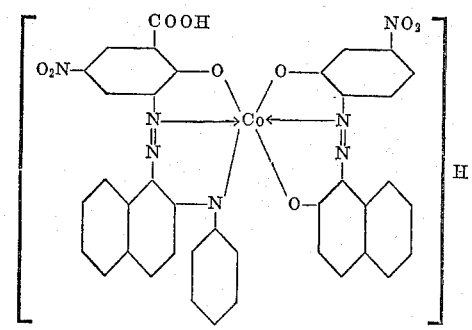

Having thus disclosed the invention, what is claimed is:
1. The 1:2 chromium complex compound of the monoazo dye of the formula

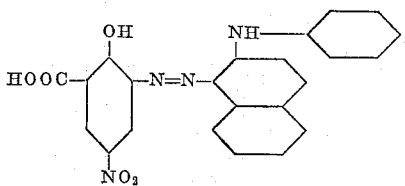

in the metal complex form

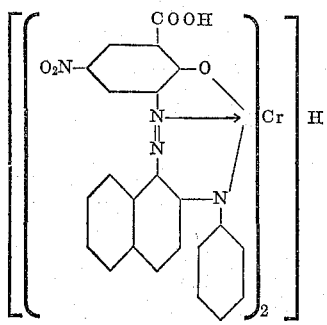

2. The 1:2 cobalt complex compound of the monoazo dye of the formula

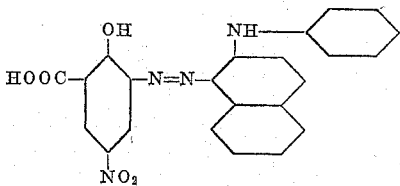

in the metal complex form

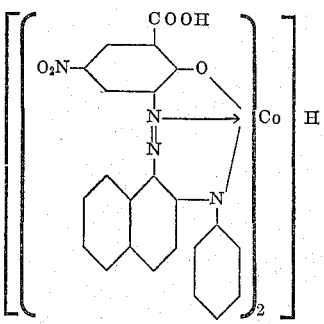

3. The 1:2 cobalt complex compound of the monoazo dye of the formula

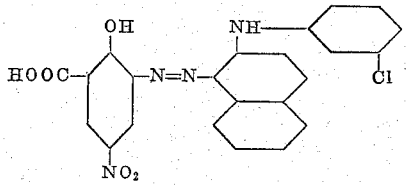

in the metal complex form

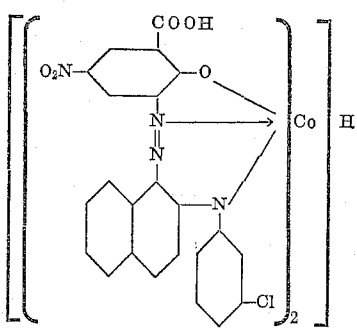

4. The 1:2 cobalt complex compound of the monoazo dye of the formula

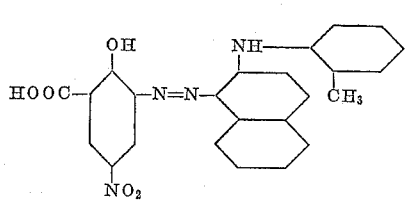

in the metal complex form

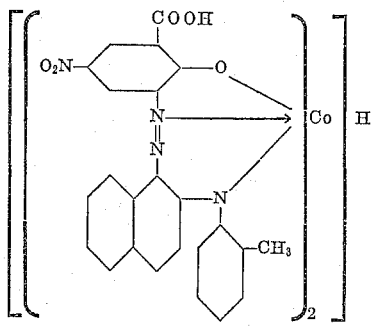

5. The 1:2 heterogeneous chromium mixed complex compound obtained from the mixture of one molecule of each of the monoazo dyes of the formula

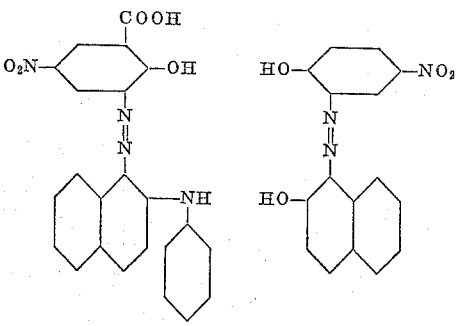

in the metal complex form

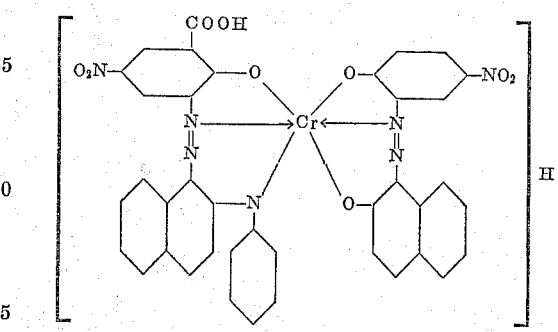

6. The 1:2 heterogenous cobalt mixed complex compounds obtained from the mixture of the monoazo dyes of the formula

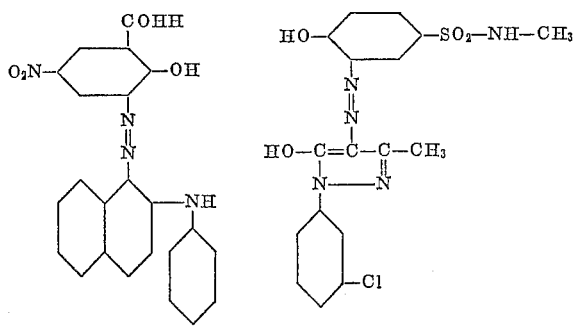

in the metal complex form

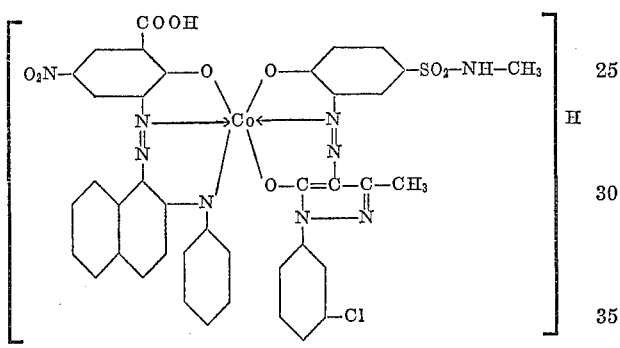

7. The 1:2 heterogeneous cobalt mixed complex compounds obtained from the mixture of the monoazo dyes of the formula

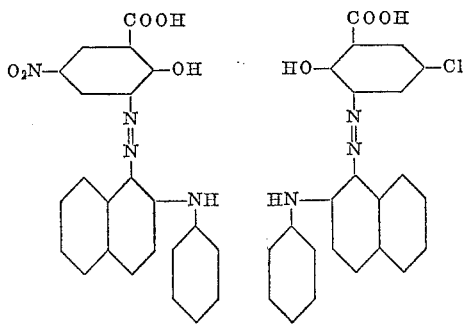

in the metal complex form

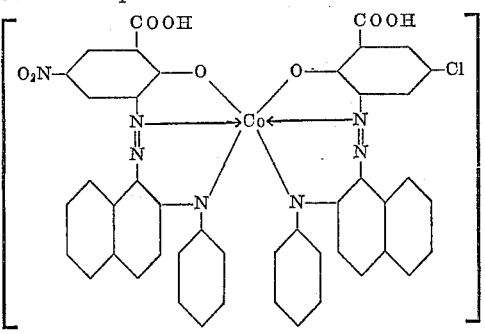

8. The 1:2 heterogeneous cobalt mixed complex compounds obtained from the mixture of the monoazo dyes of the formula

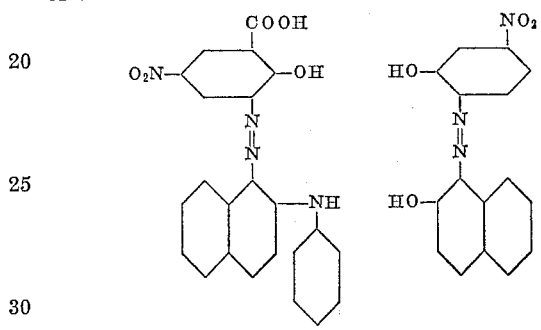

in the metal complex form

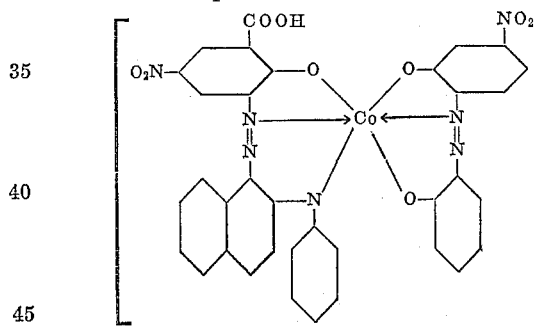

References Cited by the Examiner
UNITED STATES PATENTS 2,822,360   2/58   Ackermann _____ 260—151
3,040,019   6/62   Neier _____ 260—196

FOREIGN PATENTS 339,998   9/59   Switzerland.

CHARLES B. PARKER, *Primary Examiner.*